(12) United States Patent
Francis et al.

(10) Patent No.: US 9,090,219 B2
(45) Date of Patent: Jul. 28, 2015

(54) VEHICLE FASCIA WITH INTEGRAL ENERGY ABSORBER

(71) Applicant: GM GLOBAL TECHNOLOGY OPERATIONS LLC, Detroit, MI (US)

(72) Inventors: Wesley D. Francis, Elsternwick (AU); Nenad Eror, Burwood (AU); Burns MacGibbon, Kensington (AU)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/853,103

(22) Filed: Mar. 29, 2013

(65) Prior Publication Data

US 2014/0292006 A1    Oct. 2, 2014

(51) Int. Cl.
*B60R 19/18* (2006.01)

(52) U.S. Cl.
CPC ........... *B60R 19/18* (2013.01); *B60R 2019/186* (2013.01); *B60R 2019/1886* (2013.01)

(58) Field of Classification Search
CPC   B60R 19/18; B60R 2019/1886; B60R 19/03; B60R 19/023; B29L 2031/3044
USPC .......... 293/107, 102, 117, 120, 116, 121, 155
See application file for complete search history.

(56) References Cited

U.S. PATENT DOCUMENTS

| | | | |
|---|---|---|---|
| 6,666,488 B2 * | 12/2003 | Rinklin | 293/120 |
| 6,994,384 B2 * | 2/2006 | Shuler et al. | 293/120 |
| 7,641,245 B2 * | 1/2010 | Adachi et al. | 293/102 |

* cited by examiner

*Primary Examiner* — Joseph D Pape
*Assistant Examiner* — Dana Ivey
(74) *Attorney, Agent, or Firm* — Quinn Law Group, PLLC

(57) ABSTRACT

A bumper system for a vehicle includes a fascia having an integral energy absorber portion configured to dissipate an amount of energy due to an impact upon the fascia. The energy absorber portion includes multiple spaced formations configured to extend rearward and forward when the bumper system is installed on the vehicle. The bumper system may also include an impact beam. The fascia can be secured to the vehicle so that the fascia is positioned immediately adjacent the impact beam. The bumper system can also include a valence that covers the energy absorber portion from view, so that only a remaining display portion of the bumper system is visible from outside of the vehicle.

17 Claims, 4 Drawing Sheets

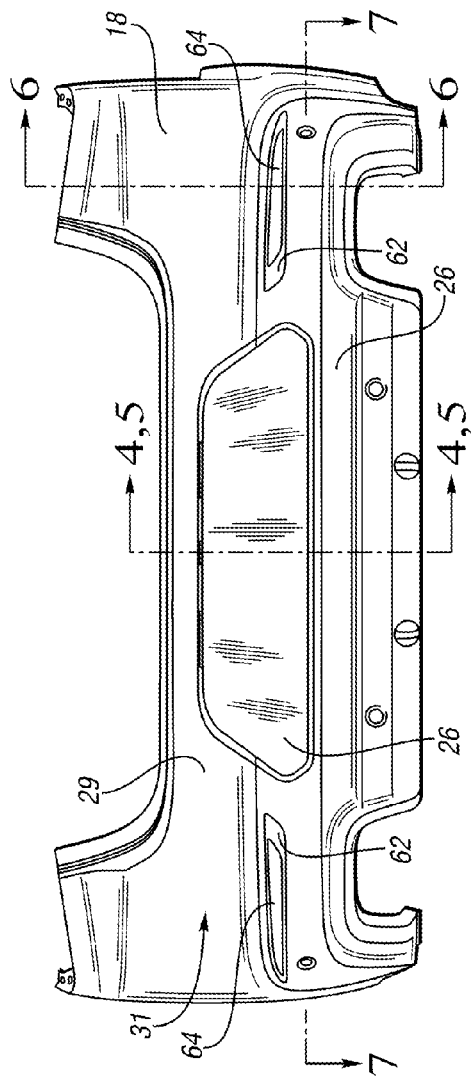
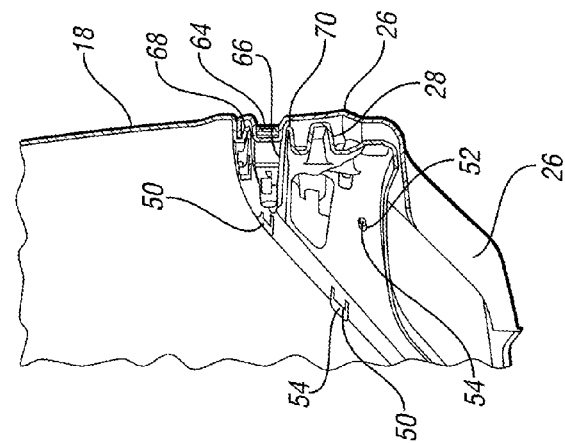
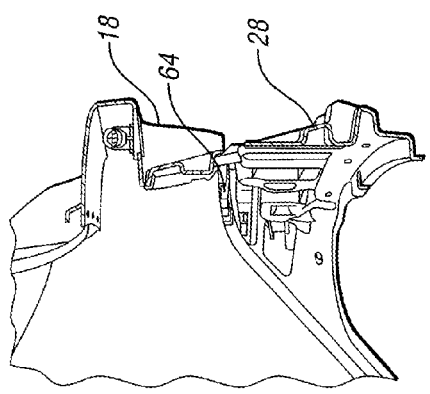
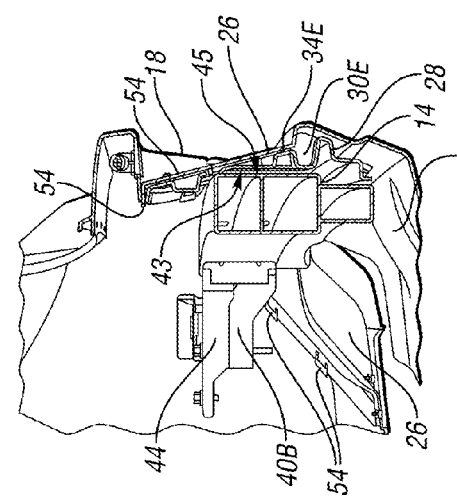
FIG. 3
FIG. 4
FIG. 5
FIG. 6

VEHICLE FASCIA WITH INTEGRAL ENERGY ABSORBER

TECHNICAL FIELD

The present disclosure relates to a fascia for a vehicle bumper system.

BACKGROUND

Vehicles often include bumper assemblies at the front and rear extremities of the vehicle. In automotive vehicles, the bumper assemblies are typically configured to dissipate the energy of a relatively low speed impact with minimal further impact energy transfer to the vehicle frame. Modern bumper assemblies sometimes use a thermoplastic polyolefin (TPO) or expanded polypropelyne (EPP) foam energy absorber placed between a fascia and a high strength impact beam to provide the required energy dissipation function.

SUMMARY

A bumper system for a vehicle includes a fascia having an integral energy absorber portion configured to dissipate a predetermined amount of energy due to an impact upon the fascia. The energy absorber portion includes multiple spaced formations configured to extend rearward and forward when the bumper system is installed on the vehicle. By integrating the energy absorber portion into the fascia, a separate energy absorber portion need not be included as part of the bumper system, reducing complexity, weight, and assembly time. The bumper system may also include an impact beam. The fascia can be secured to the vehicle so that the fascia is positioned immediately adjacent the impact beam, and in one embodiment defines about a 5 millimeter gap between the impact beam and the energy absorber portion. The bumper system can also include a valence that covers the energy absorber portion from view, so that only a remaining display portion of the bumper system is visible from outside of the vehicle.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic illustration in rear view of the bumper system of FIG. 1.

FIG. 4 is a schematic cross-sectional illustration of the bumper system taken at lines 4-4 in FIG. 3.

FIG. 5 is a schematic cross-sectional illustration of the bumper system taken at lines 5-5 in FIG. 3 with a valence and an impact beam not shown.

FIG. 6 is a schematic cross-sectional illustration of the bumper system taken at lines 6-6 in FIG. 3 with the impact beam not shown.

DETAILED DESCRIPTION

Figure 1:
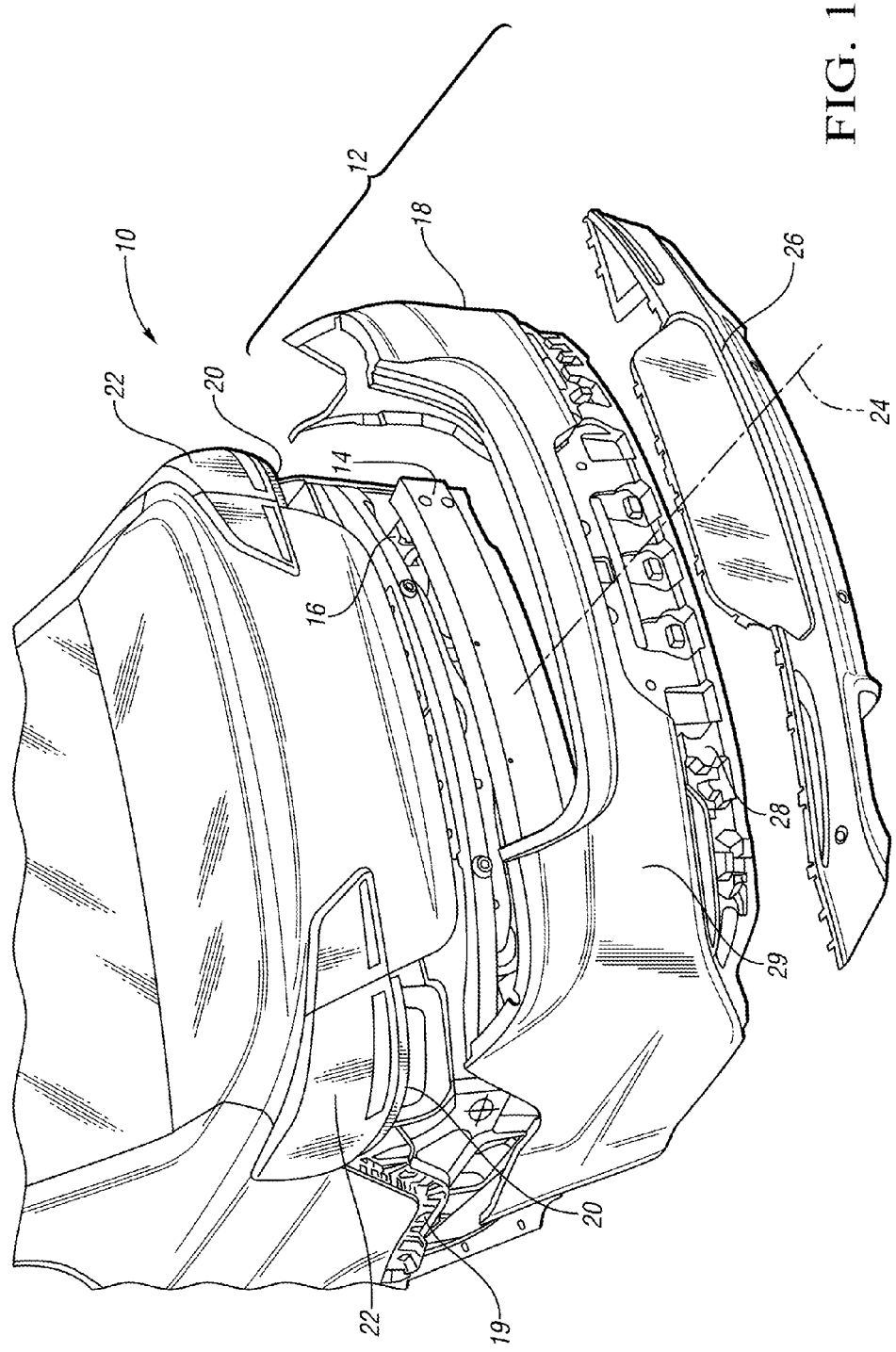
FIG. 1 is a schematic illustration in fragmentary perspective and partially exploded view of a vehicle having a bumper system in accordance with the present teachings.

Referring to the drawings, wherein like reference numbers refer to like components throughout the several views, FIG. 1 shows a rear portion of an automotive vehicle 10 with a vehicle bumper system 12 shown in partially exploded view. The bumper system 12 includes an impact beam 14 attached to longitudinally-extending side rails, one side rail 16 is shown, to span transversely across the vehicle 10. The impact beam 14 and side rails 16 form a part of the structural frame of the vehicle 10.

The bumper system 12 also includes a fascia 18 that is configured to attach to left and right rear body panels 19 (one visible in FIG. 1) and to vehicle structure 20 surrounding the tail lights 22. When installed in this manner, the fascia 18 will be immediately adjacent the impact beam 14, and just rearward of the impact beam 14, along a longitudinal axis 24 of the vehicle 10. A valence 26 is configured to connect to the fascia 18 to complete the bumper system 12. The fascia 18 and valence 26 can be preassembled as a bumper assembly before attachment to the body panels 19 and vehicle structure 20.

Figure 7:
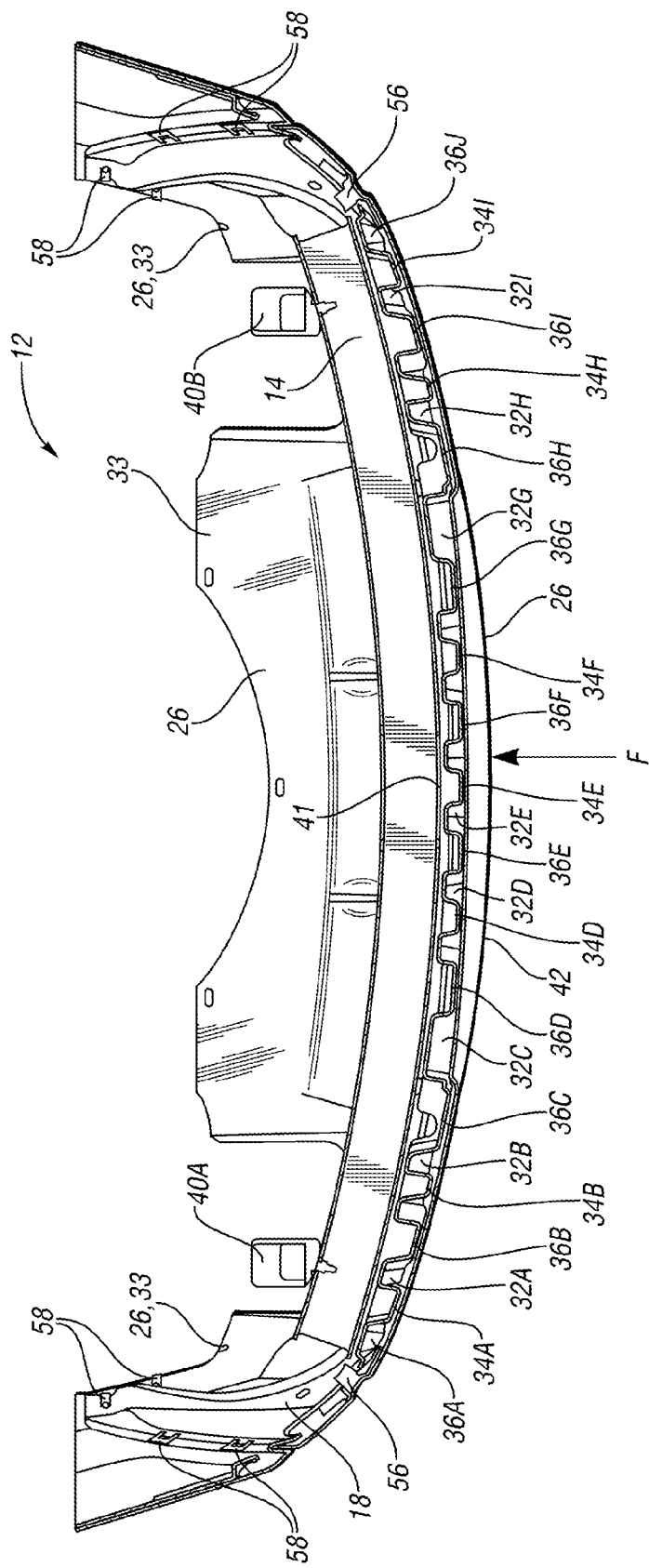
FIG. 7 is a schematic cross-sectional illustration of the bumper system taken at lines 7-7 in FIG. 3.

As discussed in further detail herein, the fascia 18 is a one-piece, unitary component with an integral energy absorber portion 28 that generally spans the width of the impact beam 14 to dissipate energy in the event of an impact, especially in the event of a relatively low speed, rear impact. By way of non-limiting example, in one embodiment, an amount of energy can be dissipated that is associated with an impact that results in a force reading of 8996 Newtons or less on an impact pendulum. The remaining portion of the fascia 18 is a display portion 29 that forms part of the viewable exterior surface 31 of the vehicle 10 as indicated in FIG. 3. When the valence 26 is secured to the fascia 18, the energy absorber portion 28 is completely covered by the valence 26. The valence 26 and the display portion 29 are viewable from the rear of the vehicle 10 and form the rear exterior surface. FIG. 7 shows the valence 26 extending rearward of the energy absorber portion 28 of the fascia 18. A lower portion 33 of the valence 26 also extends under and forward of the fascia 18.

Figure 2:
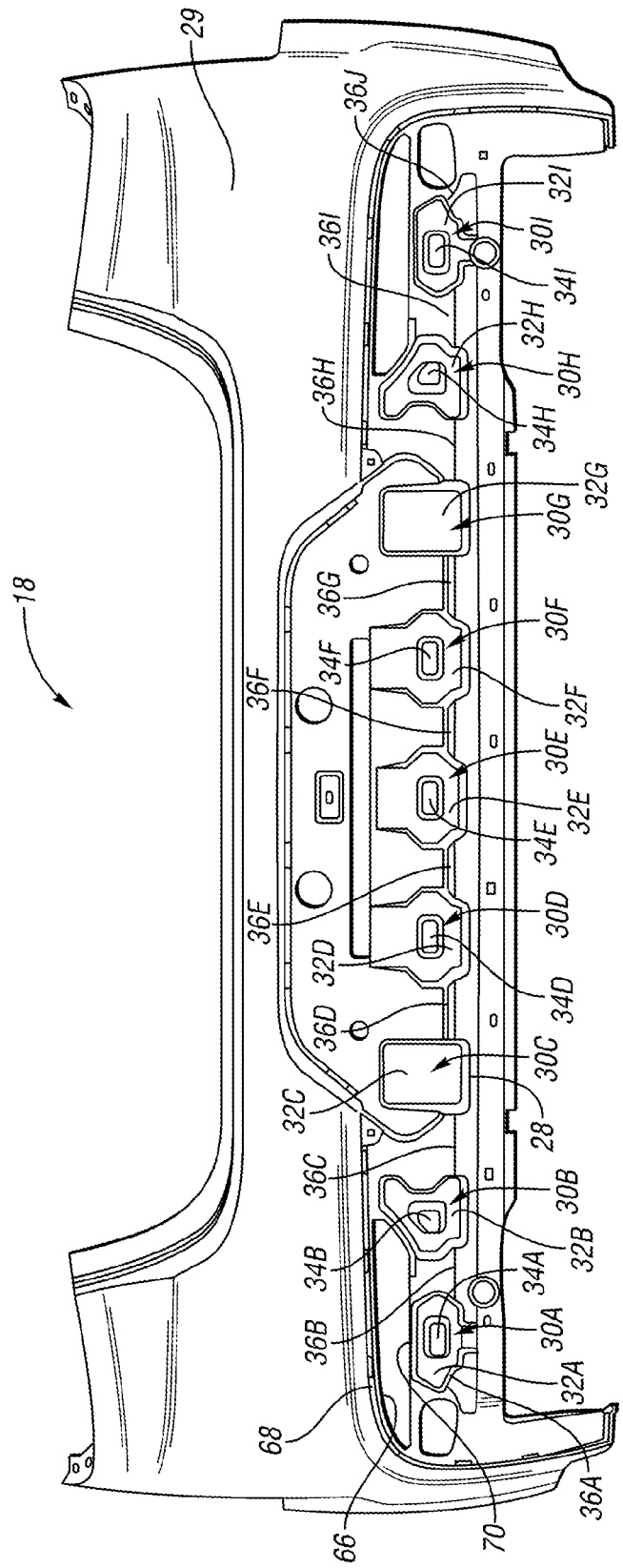
FIG. 2 is a schematic illustration in rear view of a fascia with an energy absorber portion included in the bumper system of FIG. 1.

FIG. 2 shows the fascia 18 as it would be positioned when installed to face rearward on the vehicle 10. The fascia 18 is an injection-molded component that can be a TPO material or other material able to provide the requisite level of energy absorption. The energy absorber portion 28 of the fascia 18 extends generally across the entire lower extent of the fascia 18. The energy absorber portion 28 includes multiple spaced formations 30A, 30B, 30C, 30D, 30E, 30F, 30G, 30H, and 30I configured to extend fore and aft (i.e., forward and rearward) when the fascia 18 is installed on the vehicle 10. Each of the spaced formations 30A, 30B, 30C, 30D, 30E, 30F, 30G, 30H, and 30I includes a recess 32A, 32B, 32C, 32D, 32E, 32F, 32G, 32H, and 32I which is further forward in the vehicle 10 than the immediately surrounding material of the energy absorber portion 28. The shapes of the recesses 32A, 32B, 32C, 32D, 32E, 32F, 32G, 32H, and 32I have been determined according to available packaging space and computer aided engineering (CAE) modeling to maximize energy absorbing capability under a forward-directed impact.

The recesses 32A, 32B, 32D, 32E, 32F, 32H, and 32I each have a rearward extending protrusion 34A, 34B, 34D, 34E, 34F, 34H, 34I generally centrally-located within the respective recess. Moreover, areas of the energy absorber portion 28 between the recesses 32A, 32B, 32C, 32D, 32E, 32F, 32G, 32H, and 32I are configured to protrude rearward even further than the protrusions 34A, 34B, 34D, 34E, 34F, 34H and 34I, forming ridge portions 36A, 36B, 36C, 36D, 36E, 36F, 36G, 36H, 36I, and 36J. The ridge portions 36A, 36B, 36C, 36D, 36E, 36F, 36G, 36H, 36I, and 36J generally align with one another and are interrupted only by the recessed portions 32A, 32B, 32C, 32D, 32E, 32F, 32G, 32H, and 32I.

As shown in FIG. 7, in the area of the spaced formations 30A, 30B, 30C, 30D, 30E, 30F, 30G, 30H, and 30I, the fascia 18 is spaced only slightly rearward of the impact beam 14 to define a gap 41 therebetween. In one embodiment, the gap 41 is only about 5 millimeters. As used herein, "about" a given value means within 10 percent of a value. No other components are in the gap 41 so that an inner surface 43 of the fascia 18 faces an outer surface 45 of the impact beam 14. Brackets 40A, 40B are shown attached to the impact beam 14. The brackets 40A, 40B are then secured to the vehicle side rails 16 (one shown in FIG. 1). FIG. 4 shows one of the brackets 40B with a side rail attachment feature 44 attached to both the bracket 40B and configured to attach to the side rail 16 of FIG. 1.

It is apparent in FIG. 7 that an impact force F on the rear periphery 42 of the vehicle 10, which is at the bumper system 12, will be transferred through the valence 26 to the energy absorber portion 28 of the fascia 18. The impact energy will tend to deform one or more of the spaced formations 30A, 30B, 30C, 30D, 30E, 30F, 30G, 30H, and 30I depending upon the location of the impact, with the deformation dissipating the impact energy. Each of the rearward-extending protrusions 34A, 34B, 34D, 34E, 34F, 34H, 34I as well as the ridge portions 36A, 36B, 36C, 36D, 36E, 36F, 36G, 36H, 36I, and 36J function as miniature crush boxes, absorbing and dissipating impact energy. The thickness of the fascia 18 and the arrangement of the spaced formations 30A, 30B, 30C, 30D, 30E, 30F, 30G, 30H, and 30I are configured to be sufficient to dissipate energy of an impact applied at a predetermined speed. In one embodiment, the fascia 18 is designed to absorb impact energy while protecting vehicle components such as the trunk lid, tail lamps, and exhaust system. Accordingly, by providing an integral energy absorber portion 28 in the unitary, one-piece fascia 18 that is sufficient to dissipate impact energy as described, a separate energy absorber, such as a foam energy absorber, is not needed in the bumper system 12. Moreover, the energy absorber portion 28 is thinner in the direction of the longitudinal axis 24 than a typical foam energy absorber. The elimination of a separate energy absorber can thus reduce the packaging space required for the bumper system 12, as well as save assembly time, simplify component logistics, and reduce tooling and component costs.

FIG. 4 shows one of the protrusions 34E and one of the recesses 30E adjacent the impact beam 14. The valence 26 is contoured to fit closely over the energy absorber portion 28. The fascia 18 has multiple upper apertures 50 and lower apertures 52 generally around the periphery of the energy absorber portion 28 as shown in FIG. 2. The valence 26 is formed with integral fastener portions 54, some of which are visible in FIGS. 4 and 6, and that are designed to clip or snap into the apertures 50, 52 to secure the valence 26 to the fascia 18, as shown in FIGS. 4 and 6. Other suitable methods of attaching the valence 26 to the fascia 18 can instead be used. Brackets 56 and fastening clips 58 secure the fascia 18 to the rear panels 19 as shown in FIG. 7.

As shown in FIGS. 3 and 6, the valence 26 has recesses 62 in which rear reflectors 64 are supported by the valence 26. The fascia 18 is formed with mating openings 66 that are sufficiently sized to allow the recesses and reflectors 64 to be partially inserted through these openings 66. As shown in FIG. 6, this enables spaced formations of the energy absorber portion 28, specifically in the form of ridges 68, 70, to surround the reflector 64, helping to protect the reflector 64 in the event of an impact.

The bumper system 12 is thus installed on the vehicle 10 in a position such that the energy absorber portion 28 is configured to receive an impact load in the event of an impact on the periphery of the vehicle 10. In the embodiment shown, the bumper system 12 is located in the rearward section of the vehicle 10 with the display surface 29 of the fascia 18 facing rearward and is a rear bumper. However, the fascia 18 could be used in a bumper system located in the forward section of the vehicle as a front bumper within the scope of the claimed invention.

While the best modes for carrying out the invention have been described in detail, those familiar with the art to which this invention relates will recognize various alternative designs and embodiments for practicing the invention within the scope of the appended claims.

The invention claimed is:

1. A bumper system for a vehicle comprising:
a fascia having a display portion and having an integral energy absorber portion; wherein the integral energy absorber portion is configured to dissipate energy due to an impact upon the fascia; wherein the integral energy absorber portion includes multiple spaced formations configured to extend rearward and forward when the bumper system is installed on the vehicle;
a valence secured to the fascia and covering the integral energy absorber portion without covering the display portion;
wherein the display portion of the fascia and the valence together define an exterior surface;
wherein at least some of the spaced formations include recesses and protrusions surrounded by the recesses; and
wherein the protrusions are configured to extend toward the valence relative to the recesses when the bumper system is installed on the vehicle.

2. The bumper system of claim 1, further comprising:
a reflector supported by the valence in a recess of the valence; and
wherein the fascia has an opening sized to permit the reflector supported in the recess of the valence to be partially inserted therethrough such that at least some of the spaced formations surround the reflector.

3. The bumper system of claim 2, wherein said at least some of the spaced formations that surround the reflector are ridges.

4. The bumper system of claim 1, further comprising:
an impact beam configured to attach to the vehicle; and
wherein the integral energy absorber portion is positioned immediately rearward of the impact beam along a longitudinal axis of the vehicle.

5. The bumper system of claim 4, wherein the energy absorber portion and the impact beam define about a 5 millimeter gap between one another.

6. The bumper system of claim 1, wherein the valence has integral fastener portions; and wherein the fascia is formed with apertures configured to receive the integral fastener portions to secure the valence to the fascia.

7. The bumper system of claim 1, wherein the energy absorber portion forms ridge portions that align with one another and are interrupted only by the recesses.

8. A bumper system for an automotive vehicle comprising:
an impact beam configured to span generally transversely with respect to the vehicle;
a unitary, one-piece fascia having a display portion and having an energy absorber portion configured to dissipate energy due to an impact upon the fascia;
wherein the unitary, one-piece fascia is configured to attach to the vehicle such that the energy absorber portion is positioned immediately adjacent the impact beam along a longitudinal axis of the vehicle;

wherein the energy absorber portion includes multiple spaced formations configured to extend rearward and forward when the bumper system is installed on the vehicle;

a valence secured to the fascia and covering the unitary, one-piece energy absorber portion without covering the display portion;

wherein at least some of the spaced formations include recesses and protrusions surrounded by the recesses; wherein the protrusions are configured to extend rearward from the recesses when the bumper system is installed on the vehicle; and wherein the energy absorber portion forms ridge portions that align with one another and are interrupted only by the recesses.

9. The bumper system of claim 8, wherein the energy absorber portion and the impact beam define about a 5 millimeter gap between one another.

10. The bumper system of claim 8, further comprising:
a reflector supported by the valence in a recess of the valence; and
wherein the unitary, one-piece fascia has an opening sized to permit the reflector supported in the recess of the valence to be partially inserted therethrough such that at least some of the spaced formations surround the reflector.

11. The bumper system of claim 10, wherein said at least some of the spaced formations that surround the reflector are ridges.

12. The bumper system of claim 8, wherein the valence is formed with integral fastener portions; and wherein the unitary, one-piece fascia is formed with apertures configured to receive the integral fastener portions.

13. A vehicle comprising:
rear body panels;
a rear bumper system comprising:
a rear impact beam spanning generally transversely and positioned between the rear body panels;
a unitary, one-piece fascia secured to the rear body panels and extending rearward of the rear impact beam on the vehicle; wherein the unitary, one-piece fascia has a display portion forming an exterior surface of the vehicle and an integral energy absorber portion configured to dissipate energy due to an impact upon the unitary, one-piece fascia; wherein an inner surface of the unitary, one-piece fascia faces an outer surface of the impact beam;
wherein the integral energy absorber portion includes multiple spaced formations configured to extend rearward and forward; wherein at least some of the spaced formations include recesses and protrusions surrounded by the recesses; and wherein the protrusions are configured to extend rearward from the recesses.

14. The vehicle of claim 13, wherein the bumper system further includes a valence secured to the unitary, one-piece fascia and covering the integral energy absorber portion.

15. The vehicle of claim 13, further comprising:
at least one reflector supported by the valence to face rearward on the exterior of the vehicle; and
wherein at least some of the spaced formations at least partially surround said at least one reflector.

16. The vehicle of claim 15, wherein said at least some of the spaced formations that surround said at least one reflector are ridges.

17. The vehicle of claim 13, wherein the energy absorber portion forms ridge portions that align with one another and are interrupted only by the recesses.

* * * * *